UNITED STATES PATENT OFFICE.

HAYDN M. BAKER, OF WILLIAMSBURG, NEW YORK, ASSIGNOR TO HARVEY P. DANGWORTHY AND NEWTON F. HILTON, OF OIL CITY, PENN.

IMPROVEMENT IN PROCESSES OF REFINING PETROLEUM, &c.

Specification forming part of Letters Patent No. 133,399, dated November 26, 1872.

*To all whom it may concern:*

Be it known that I, HAYDN M. BAKER, of Williamsburg, in Kings county and State of New York, have invented a new and useful Improvement in Refining Petroleum and Coal Oils; and the following is hereby declared to be a full and exact description thereof.

Anhydrous and hydrated alumina in mechanical contact with other compounds under various conditions, such as certain ranges of temperature and positive alkaline or acid property of the bodies met, exhibit acid characters upon one occasion, and basic or alkaline properties at another. As an example or illustration of this statement, it may be mentioned that the union of alumina and silica exists with augmented force at elevated temperatures, and the affinity of alumina for potassa, soda, and other alkaline bodies is greatly increased by the same agency. Silica comports itself as an acid toward alumina under the conditions set forth, and the alumina itself behaves like a powerful alkali or base. With the substitution of potassa or soda for silica, its deportment is that of a strong acid subjected to the same condition. At ordinary temperatures alumina is prepared to act either as an acid or alkali, because its affinities are very feeble in this condition, except for some organic coloring matters.

The process herein set forth for refining petroleum and coal oils was devised with a view of acquiring the advantages resulting from the propensity of alumina to act the part of either an acid or base toward other bodies.

To enable those skilled in the art of refining petroleum and coal oils to avail themselves of the advantages of this process, its application will now be described.

Into a retort provided with an agitator introduce any desired quantity of crude petroleum or coal oil and about one-quarter of a pound of anhydrous or hydrated alumina to every gallon of crude material to be acted upon. Heat should then be applied, and the temperature gradually elevated after the retort is sealed. The agitator should also be put in motion to cause the alumina to be evenly suspended through the liquid and prevent its precipitation to the bottom, and thereby opposing the transmission of heat to the charge. After the ebullition is thoroughly established the agitation may be suspended or abandoned, and the temperature regularly and gradually increased. The products which pass to the receiver as the distillation proceeds are of the same grades, but superior in quality to those peculiar to any fractional distillation of petroleum and coal oils. As the process progresses the temperature is constantly becoming more exalted; consequently the alumina becomes more powerfully acid or basic, and induces the same effect, by a different action, as the sulphuric acid and caustic alkali of the present well-known method. After the distillation is completed the alumina remains in the retort with the tarry residuum, which may, after a proper depression of the temperature, be removed and subjected to the action of an elevated temperature, which destroys the organic matter and leaves the recovered alumina behind for reuse in the distillation of new quantities of crude oil. There is some sulphide of aluminium formed in the distillation, but that may be decomposed into alumina and sulphuret of hydrogen by washing the burned alumina with water.

The least quantity of alumina which may be used for the attainment of desirable results is hereinbefore mentioned, but the use of a more limited quantity is of some benefit, while the employment of an excess enhances the value of the distillate; so it will be observed that the relative quantity of alumina employed constitutes no part of the claim. Anhydrous and hydrated alumina are also mentioned as the agents; therefore it is proper to state that the water of the hydrated compound is expelled from the retort by the increased temperature as the distillation proceeds, and this water lugs over and washes the light products; but at or approaching the conclusion of the process its action is the same as with the anhydrous body, and it is during these stages that its influence is most desired. Anhydrous clay exerts a very similar action to alumina, when used in the same way.

The advantages of this invention are that it provides an economical and convenient method of refining oils.

What I claim as my invention, and desire to secure by Letters Patent, is—

The process of refining petroleum and coal oils by the use of alumina and anhydrous clay, substantially as herein described.

HAYDN M. BAKER.

Witnesses:
GEO. T. PINCKNEY,
CHAS. H. SMITH.